(12) United States Patent
Fluke et al.

(10) Patent No.: US 7,240,334 B1
(45) Date of Patent: Jul. 3, 2007

(54) METHODS, SYSTEMS, AND COMPUTER PROGRAM PRODUCTS FOR DEFERRED COMPUTER PROGRAM TRACING

(75) Inventors: John Christian Fluke, Raleigh, NC (US); Joel Mark Yarborough, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 09/607,074

(22) Filed: Jun. 29, 2000

(51) Int. Cl.
G06F 9/44 (2006.01)
G06F 3/00 (2006.01)

(52) U.S. Cl. .................... 717/128; 717/137; 710/52
(58) Field of Classification Search ............... 717/124, 717/127, 128, 137; 710/52; 709/105, 201, 709/203
See application file for complete search history.

(56) References Cited

U.S. PATENT DOCUMENTS

| | | | |
|---|---|---|---|
| 3,707,725 A * | 12/1972 | Dellheim ................. | 717/128 |
| 4,941,102 A | 7/1990 | Darnell et al. ............. | 364/513 |
| 5,265,254 A * | 11/1993 | Blasciak et al. ........... | 717/130 |
| 5,297,150 A | 3/1994 | Clark ..................... | 371/19 |
| 5,450,586 A * | 9/1995 | Kuzara et al. ............. | 717/124 |
| 5,717,841 A | 2/1998 | Farrell et al. ............. | 395/114 |
| 5,787,245 A | 7/1998 | You et al. ................ | 395/183.14 |
| 5,809,293 A | 9/1998 | Bridges et al. ........... | 395/568 |
| 5,815,653 A | 9/1998 | You et al. ................ | 395/183.14 |
| 5,881,213 A | 3/1999 | Shaw et al. ............... | 395/114 |
| 5,983,366 A * | 11/1999 | King ...................... | 714/38 |
| 6,249,909 B1 * | 6/2001 | Russo et al. .............. | 717/100 |
| 6,282,701 B1 * | 8/2001 | Wygodny et al. ......... | 717/125 |

FOREIGN PATENT DOCUMENTS

| | | |
|---|---|---|
| EP | 0897151 A1 | 2/1999 |
| JP | 61-210439 | 9/1986 |
| JP | 62-093733 | 4/1987 |
| JP | 62-214444 A | 9/1987 |

OTHER PUBLICATIONS

Ziya Aral and Ilya Gertner, "High-Level Debugging in Parasight," Nov. 1988, ACM SIGPLAN Notices, Porceedings of the 1988 ACM SIGPLAN and SIGOPS workshop on Parallel and distributed debugging, vol. 24 Issue 1, pp. 151-162.*

(Continued)

*Primary Examiner*—Tuan Dam
*Assistant Examiner*—Eric B. Kiss
(74) *Attorney, Agent, or Firm*—Myers Bigel Sibley & Sajovec, PA (57) ABSTRACT

An application (e.g., a computer program) prints data by invoking a print function with a format argument and, optionally, at least one data argument. The format argument and any data arguments are saved in a deferred trace data buffer. The print function returns to the application then, sometime after the print function has returned, the deferred trace data buffer is processed and the format argument and/or any data arguments are printed. By saving the format argument and any data argument(s) to a memory buffer instead of parsing and formatting the arguments in real-time, program efficiency may be improved and the impact of the print function on a software test scenario may be reduced.

45 Claims, 6 Drawing Sheets

OTHER PUBLICATIONS

Keith Bugg, "Debugging Visual C++ Windows; Chapter 3: The Visual C++ Debugging Environment," [online] 1998 [accessed Jan. 14, 2003], Retrieved from Internet <URL: http://www.rdbooks.com/store/products/chapter/kbugg7.htm>, pp. 1-5.*

Jeff Delaney, "Subject: Re: Debugging MTS-components," [online] 1998 [accessed Jan. 15, 2003], Retrieved from Internet <URL: http://groups.google.com/groups?selm=%23RPRRYiu9GA.243%40uppssnewspub05.moswest.msn.net&oe=UTF-8&output=gplain>, pp. 1-2.*

Bill Karwin, "Subject: Okay," [online] 1990 [accessed Jan. 15, 2003], Retrieved from Internet <URL: http://www.queue.com/pointers.html>, pp. 1-5.*

Thom Maughan and Kathryn Rafac, "DSP/BIOS by Degrees: Using DSP/BIOS Features in an Existing Application," Texas Instruments, Application Report SPRA591, Dec. 1999, pp. 1-51.*

"TMS320C54x DSP/BIOS Application Programming Interface (API) Reference Guide," Texas Instruments, Literature No. SPRU40A, May 2000, pp. i, ii, and "1-118" through "1-120".*

"TMS320C54x DSP/BIOS User' Guide," Texas Instruments, Literature No. SPRU326C, May 2000, pp. i, ii, and " 3-1" through "3-31".*

"TMS320C6000 DSP/BIOS User's Guide," Texas Instruments, Literature No. SPRU303, May 1999, pp. i, ii, and "6-38" through "6-50".*

Henry Yiu, "Understanding Basic DSP/BIOS Features," Texas Instruments, Application Report SPRA653, Apr. 2000, pp. 1-14.*

Dominic Morris, "Z88 Development Kit: A Small C+ Compiler for Z80 based Machines," Apr. 17, 2000 [online], [accessed Jul. 26, 2006], Retrieved from Internet <URL: http://z88dk.sourceforge.net/old/zcc.html>, (13 pages).*

Paredes, *Efficient File Format for the Abridged Description of Hardware*, IBM Technical Bulletin, V. 41, N. 1, Jan. 1998, pp. 191-198.

Slane, *Dynamically Skipped Code Using Jump/Branch Debug Instruction*, IBM Technical Bulletin, V. 37, N. 4, Apr. 1994, pp. 429-430.

Goldrian, *Tracing of Large Amounts of Data by Using Main Memory as a Trace Buffer*, IBM Technical Bulletin, V. 40, N. 6, Jun. 1997, pp. 47-50.

Spenser, *Creation of Simulation Testcases for New Hardware on Previous Generation Hardware*, IBM Technical Bulletin, V. 36, N. 8, Aug. 1993, pp. 675-680.

Schmidt, *Checkpoint Record With Control Information*, IBM Technical Bulletin, V. 36, N. 3, Mar. 1993, pp. 297-298.

Jordan et al., *Distributed Trace Formatter: A Program to Format Tract Data in Any Format and Any Language*, IBM Technical Bulletin, Sep. 1991, pp. 295-297.

Sirkin et al., *Brktfmt—A Program to Bracket and Make More Readable Formatted Traces From Os/2 EE Database Manager*, IBM Technical Bulletin, Jul. 1991, pp. 176-180.

Bohrer et al., *Method to Provide Changes to the Aix Operating System Kernel for Multi-Process Debugging*, IBM Technical Bulletin, Jul. 1990, pp. 276-278.

Bello et al., *Four-Way EVENT TRACE*, IBM Technical Bulletin, Nov. 1989, pp. 381-385.

Hooten, *Two-Format Scrolling of Instruction Trace Buffer of Debug Facility*, IBM Technical Bulletin, Jun. 1985, p. 240.

IBM, *Trace*, IBM Technical Bulletin, Dec. 1997, pp. 2561-2562.

Cianciosi et al., *Interactive Alter Display Instruction Trace Programming Aid*, IBM Technical Bulletin, Aug. 1974, pp. 734-738.

Memis et al., *On Line Debug Macro and Subroutine*, IBM Technical Bulletin, Oct. 1971, pp. 1500-1503.

Trace Library, http://www.cs.arizona.edu/xkernel/www/manual/section3-9.html, Jul. 15, 1999, 1 p.

Functions for Debugging p4 Programs, http://www-fp.mcs.anl.gov/~lusk/p4/p4-manual/node32.html, Jul. 15, 1999, 3 pp.

Re: libc/printf.c, http://www.zendo.com/vandys/vsta-mail/6/0007.html, Jul. 15, 1999, 1 p.

*Safety Critical Verification Tools*, Applied Microsystems Corporation, www.amc.com/amc4/products/verify.html, 2000.

*CodeTEST® Embedded Software Test and Analysis Tools*, Applied Microsystems Corporation, www.amc.com/products/embedded_sw_test.html, 2000.

CodeTRACE™ Source-Level Trace Analysis Tool, Applied Microsystems Corporation, www.amc.com/products/emb_sware_test _and _analysis_tools/codetrce.html, 2000.

* cited by examiner

METHODS, SYSTEMS, AND COMPUTER PROGRAM PRODUCTS FOR DEFERRED COMPUTER PROGRAM TRACING

FIELD OF THE INVENTION

The present invention relates generally to the field of computer programming, and, more particularly, to debugging of computer programs.

BACKGROUND OF THE INVENTION

Providing a software debug capability may be problematic at various phases during the software development life cycle. For example, operating systems may provide source code level debuggers that may be useful for initial design unit level testing on a host system. As the software product progresses through the development process, however, debuggers may not be available for target system testing and/or field testing. Some embedded software systems may not have the support of a software debugger or analyzer. Moreover, certain types of real-time sensitive software routines, such as device drivers, may not be compatible with conventional software debug tools.

One option for collecting debug data when testing high-level software is to call a conventional print function, which is typically provided in most high level programming languages. For example, the C programming language provides the printf( ) library function for writing data to a standard output. Unfortunately, the printf( ) function may be relatively inefficient, as parsing and formatting the arguments to the printf( ) function may be time consuming. As a result, real-time sensitive software routines, such as device drivers, may not be allowed to make printf( ) function calls. Furthermore, the inefficiency of the printf( ) function may alter a test scenario so drastically that it may become invalid.

Another option for collecting debug data is to implement a custom trace. A custom trace typically involves the definition of a set of symbols and the allocation of a trace buffer. The software may then be modified to write specific symbols into the trace buffer when certain portions of code are executed. When a software error occurs, the trace buffer may be read and the symbols stored therein decoded. These symbols may then be used to determine the program flow that led to the error. While a custom trace may be more efficient than calls to a conventional print function, it may be more difficult to implement and maintain.

SUMMARY OF THE INVENTION

According to embodiments of the present invention, an application (e.g., a computer program) prints data by invoking a print function with a format argument and, optionally, at least one data argument. The format argument and any data arguments are saved in a deferred trace data buffer. The print function returns to the application then, sometime after the print function has returned, the deferred trace data buffer is processed and the format argument and/or any data arguments are printed. By saving the format argument and any data argument(s) to a memory buffer instead of parsing and formatting the arguments in real-time, program efficiency may be improved and the impact of the print function on a software test scenario may be reduced.

In accordance with embodiments of the present invention, the format argument and any data argument(s) may be printed by retrieving the format argument and any data argument(s) from the deferred trace data buffer. Any data argument(s) retrieved may then be formatted based on the format argument and then printed. Advantageously, the format argument may be saved as a pointer in the deferred trace data buffer. As a result, the benefits of a conventional print routine may be provided while conserving memory in the deferred trace data buffer.

In accordance with other embodiments of the present invention, the format argument may be saved as a character string in the deferred trace buffer. This may be desirable if the address space of the application is no longer valid at the time the deferred trace data buffer is processed.

In accordance with still other embodiments of the present invention, if the format argument specifies a character string conversion, then the address of the corresponding data argument may be printed. In this case, the argument to be formatted is a pointer to a character string, which may not be relevant at the time the data arguments saved in the deferred trace data buffer are retrieved and formatted as another process may have acquired the address space where the character string is stored in memory and may have overwritten the character string data.

In accordance with further embodiments of the present invention, a deferred print flag may be used to control whether the print function parses and formats its format argument and any data argument(s) in real-time or whether a deferred trace data buffer is created for saving the format argument and any data argument(s) so that they may be parsed and formatted at a later time.

In accordance with still further embodiments of the present invention, the print function that is invoked by the application and a trace data postprocessor function that may be used to print the format argument and/or any data argument(s) saved in the deferred trace data buffer may execute in different execution threads.

In accordance with still further embodiments of the present invention, the print function that is invoked by the application and a trace data postprocessor function that may be used to print the format argument and/or any data argument(s) saved in the deferred trace data buffer may execute on different computing machines.

Thus, the present invention may be used to provide a deferred print capability that may be useful in debugging software. For example, the present invention may be particularly useful in debugging software not supported by a commercial debug system or that may be adversely impacted by calls to conventional print library functions due to inefficiencies in parsing and formatting the data to be printed.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention is described herein in the context of providing deferred computer program tracing using a modified version of the C/C++ programming language printf( ) library function. It will be understood that the present invention is not limited to the C or C++ programming languages as the principles and concepts of deferred computer program tracing discussed herein may be embodied in alternative programming languages.

The present invention may be embodied as methods, systems, and/or computer program products. Accordingly, the present invention may be embodied in software (including firmware, resident software, micro-code, etc.). Furthermore, the present invention may take the form of a computer program product on a computer-usable or computer-readable storage medium having computer-usable or computer readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer usable or computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Figure 1:
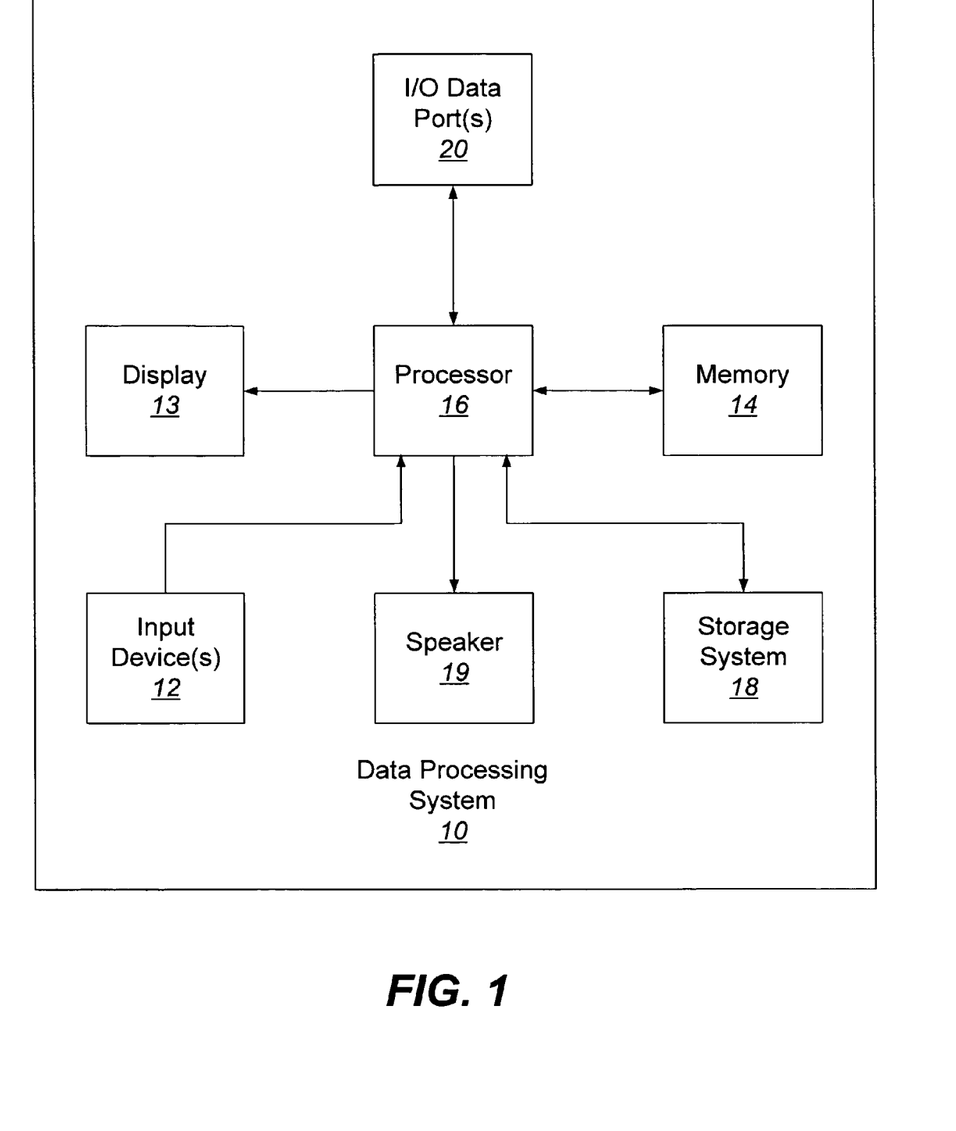
FIG. 1 is a block diagram that illustrates data processing systems in accordance with embodiments of the present invention

Referring now to FIG. 1, an exemplary data processing system 10 in accordance with embodiments of the present invention typically includes input device(s) 12, such as a keyboard or keypad, a display 13, and a memory 14 that communicate with a processor 16. The data processing system 10 may further include a storage system 18, a speaker 19, and an I/O data port(s) 20 that also communicate with the processor 16. The storage system 18 may include removable and/or fixed media, such as floppy disks, ZIP drives, hard disks, or the like as well as virtual storage such as a RAMDISK. The I/O data port(s) 20 may be used to transfer information between the data processing system 10 and another computer system or a network (e.g., the Internet). These components may be conventional components such as those used in many conventional computing devices, which may be configured to operate as described herein.

Figure 2:
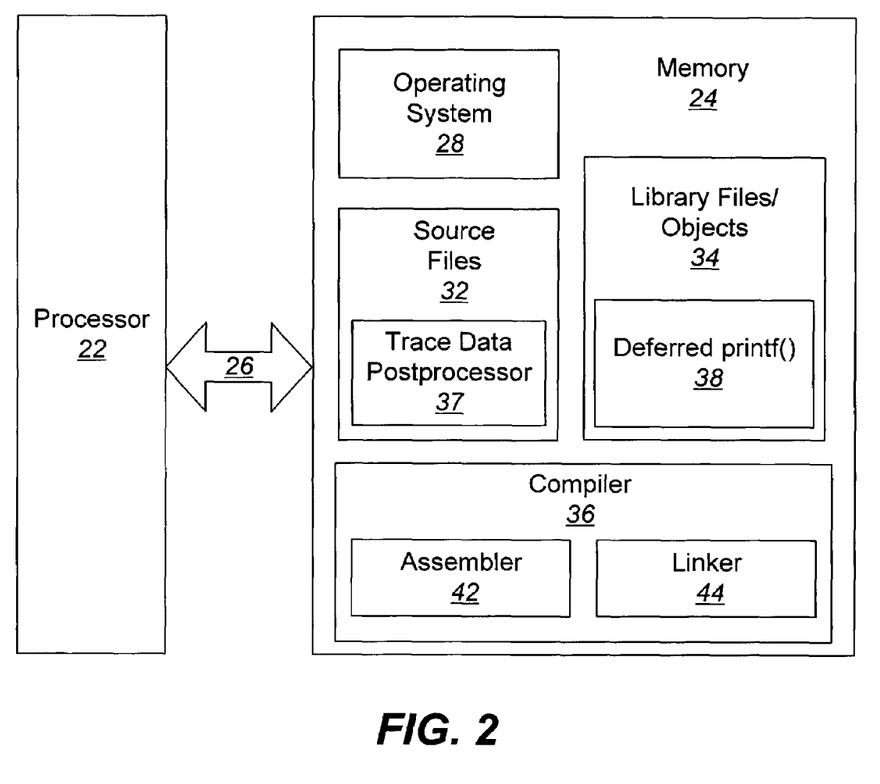
FIG. 2 is a block diagram that illustrates a processor and a memory that is configured with source code for a deferred print function and a trace data postprocessor function in accordance with embodiments of the present invention.

FIG. 2 illustrates a processor 22 and a memory 24 in accordance with embodiments of methods, systems, and computer program products for deferred computer program tracing of the present invention and may be used in embodiments of data processing systems of FIG. 1. The processor 22 communicates with the memory 24 via an address/data bus 26. The processor 22 may be, for example, a commercially available or customer microprocessor. The memory 24 is representative of the overall hierarchy of memory devices containing the software and data used to implement deferred computer program tracing in accordance with the present invention. The memory may include, but is not limited to, the following types of devices: cache, ROM, PROM, EPROM, EEPROM, flash, SRAM, and DRAM.

As shown in FIG. 2, the memory 24 may hold four major categories of software and data: the operating system 28, the source files module 32, the library files/object module 34, and the compiler module 36. The operating system 28 controls the operation of the computer system. In particular, the operating system 28 may manage the computer system's resources and may coordinate execution of programs by the processor 22. The source files module 32 includes those program files that may be compiled by the compiler module 36 into object code. Thus, the programs that are included in the source files module 32 may be called source programs because they represent the original form of the program as expressed in a particular programming language (e.g., the C programming language).

In accordance with embodiments of the present invention, the source files module 32 includes a trace data postprocessor function 37. Specifically, the trace data postprocessor function may be used to process and print data that has been stored in memory during execution of a computer program. Operations of the trace data postprocessor function 37 will be described in greater detail hereinafter.

In addition to the source files module 32, a library files/objects module 34 may also be included, which comprises standard routines and utilities typically provided by the programming language. Many high level programming languages include a print function as part of their library. In accordance with particular embodiments of the present invention, a conventional C/C++ printf( ) library function may be modified to create a deferred printf( ) library function 38. Unlike the conventional printf( ) library function, the deferred printf( ) library function 38 does not parse and format its arguments in real-time during execution, but instead saves its arguments in a buffer for later processing by the trace data postprocessor function 37. Operations of the printf( ) library function 38 will be described in greater detail hereinafter.

The deferred printf( ) library function 38 along with any other library files from the library files/objects module 34 and source files from the source files module 32 may be compiled by the compiler module 36. After the compiler module 36 has translated the source files and library files into an equivalent assembly language program, an assembler 42 may be invoked to translate the assembly language instructions into actual machine instructions that are understood by the processor 22. The machine instructions generated by the assembler 42 are often referred to as object code.

The compiler module 36 may also include a linker 44, which is used to link already compiled/assembled objects from the library files/objects module 34 with the object(s) generated based on the source files and library files. The linker 44 links all of the object code together to create an executable object. The executable object may be run or executed on the processor 22 or on another processor of the same type or that is compatible with the processor 22. Alternatively, the compiler module 36 may comprise a cross-compiler, which may be used to create an executable object for execution on a target processor different from and/or incompatible with the processor 22.

Figure 3:
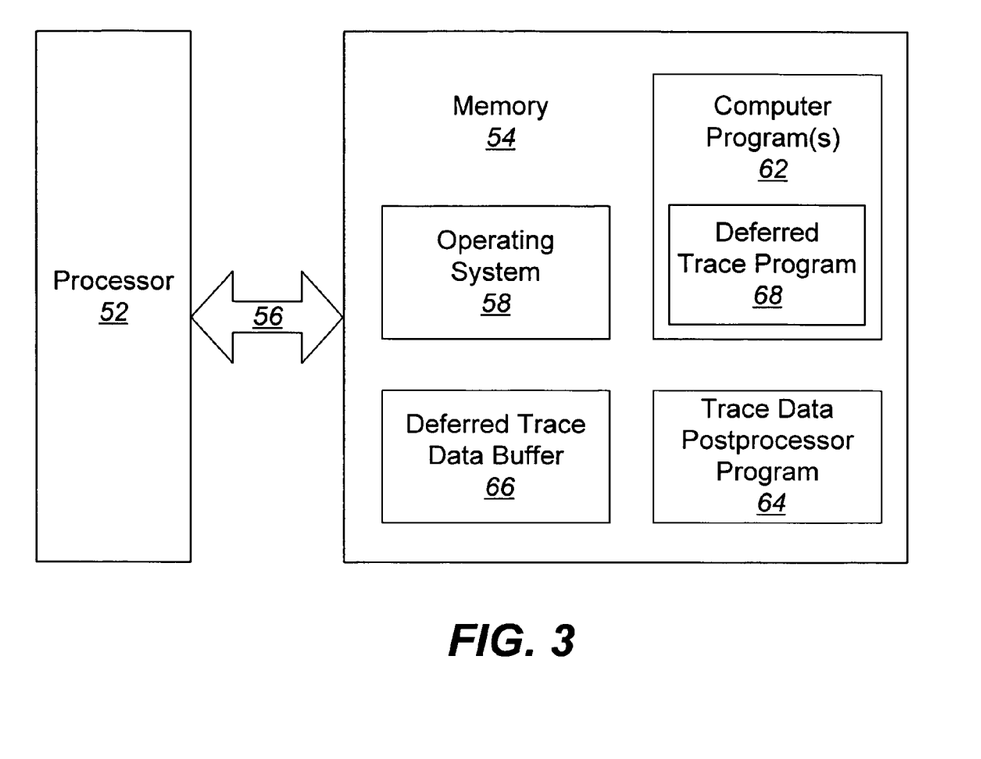
FIG. 3 is a block diagram that illustrates a processor and a memory that is configured with a deferred print program and a trace data postprocessor program in accordance with embodiments of the present invention.

FIG. 3 illustrates a processor 52 and a memory 54 that may be used to run or execute an executable object generated by the compiler module 36 of FIG. 2 in accordance with embodiments of the present invention. As discussed in the foregoing, the processor 52 may not be compatible with the processor 22. In this case, the compiler module 36 performs a cross compilation to generate an executable object for the processor 52. On the other hand, the processor 52 and the memory 54 may represent the processor 22 and the memory 24 if the executable object generated by the compiler module 36 is intended to run on the same computer system. Finally, the processor 52 may be different from, but compatible with the processor 42. The processor 52 communicates with the memory 54 via an address/data bus 56. Similar to the processor 22, the processor 52 may be, for example, a commercially available or customer microprocessor. The memory 54 is representative of the overall hierarchy of memory devices containing the software and data used to implement deferred computer program tracing in accordance with the present invention. The memory may include, but is not limited to, the following types of devices: cache, ROM, PROM, EPROM, EEPROM, flash, SRAM, and DRAM.

As shown in FIG. 3, the memory 54 may hold four major categories of software programs and data: the operating system 58, the computer program(s) 62, the trace data processor program 64, and the deferred trace data buffer 66. The role of the operating system 58 may be substantially identical to that of the operating system 28 discussed hereinabove with reference to FIG. 2. The computer program(s) 62 represent those computer program(s) that have been compiled for execution by the compiler module 36 of FIG. 2. These programs may include application programs, driver programs, utility programs (e.g., interrupt service routines, memory management routines, etc.) and the like. As used herein, the terms "application" or "application program" are used generically to encompass any program or executable code, including, for example, the operating system 58, driver programs, utility programs, and traditional application programs (i.e., programs designed to assist in the performance of a specific task).

A deferred trace program or deferred printf( ) library function program 68 is included with the computer program(s) 62 as the computer program(s) 62, the operating system 58, or other executable code (i.e., any application program) may include functions and/or methods that may call the deferred printf( ) library function program 68 for debugging purposes. Specifically, the deferred printf( ) library function program 68 does not parse and format its arguments, including a format argument and one or more data arguments, in real-time during execution, but instead saves its arguments in the deferred trace data buffer 66 for later processing. The trace data processor program 64 includes the trace data postprocessor function 37, which may be used to process and print data that has been stored in the deferred trace data buffer 66 by the deferred printf( ) library function 38 during execution of the computer program(s) 62 or other executable code.

Computer program code for carrying out operations of the present invention may be written in a high level programming language such as C or C++. In a preferred embodiment, the present invention uses the C programming language to implement most software programs. Nevertheless, it should be understood that the principles and concepts disclosed herein may also be applied to other programming languages. It should be further understood that the present invention may execute entirely on a single data processing system, comprising one or more processors, or may also be split between two different computing machines. For example, the deferred trace program 68 may execute on a first computing machine and the trace data postprocessor program 64 may execute on a second computing machine, different from the first computing machine, as will be discussed hereinafter.

The present invention is described hereinafter with reference to flowchart and/or block diagram illustrations of methods, systems, and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
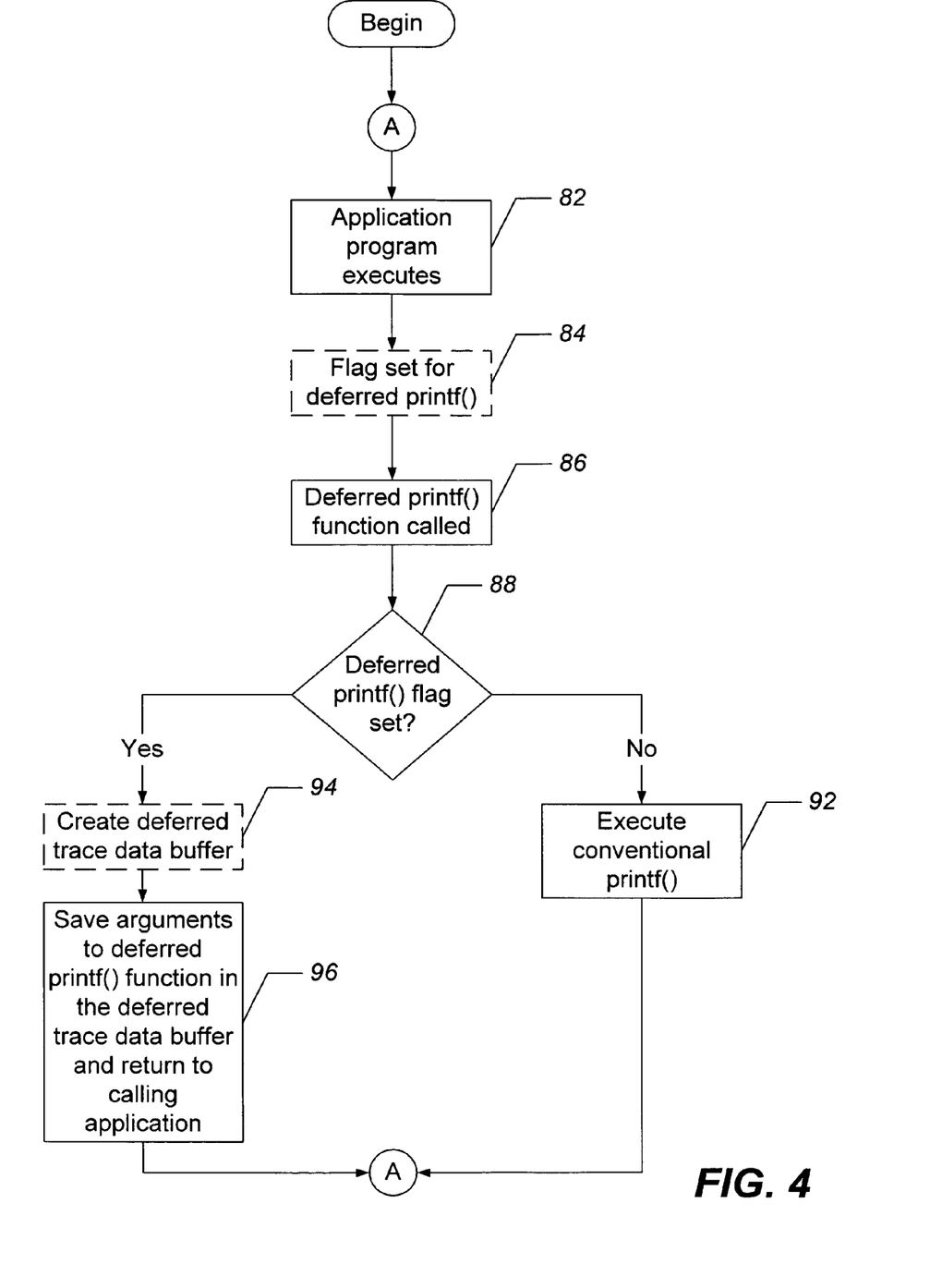
FIG. 4 is a flowchart that illustrates exemplary operations of a deferred print program in accordance with embodiments of the present invention.
Figure 5:
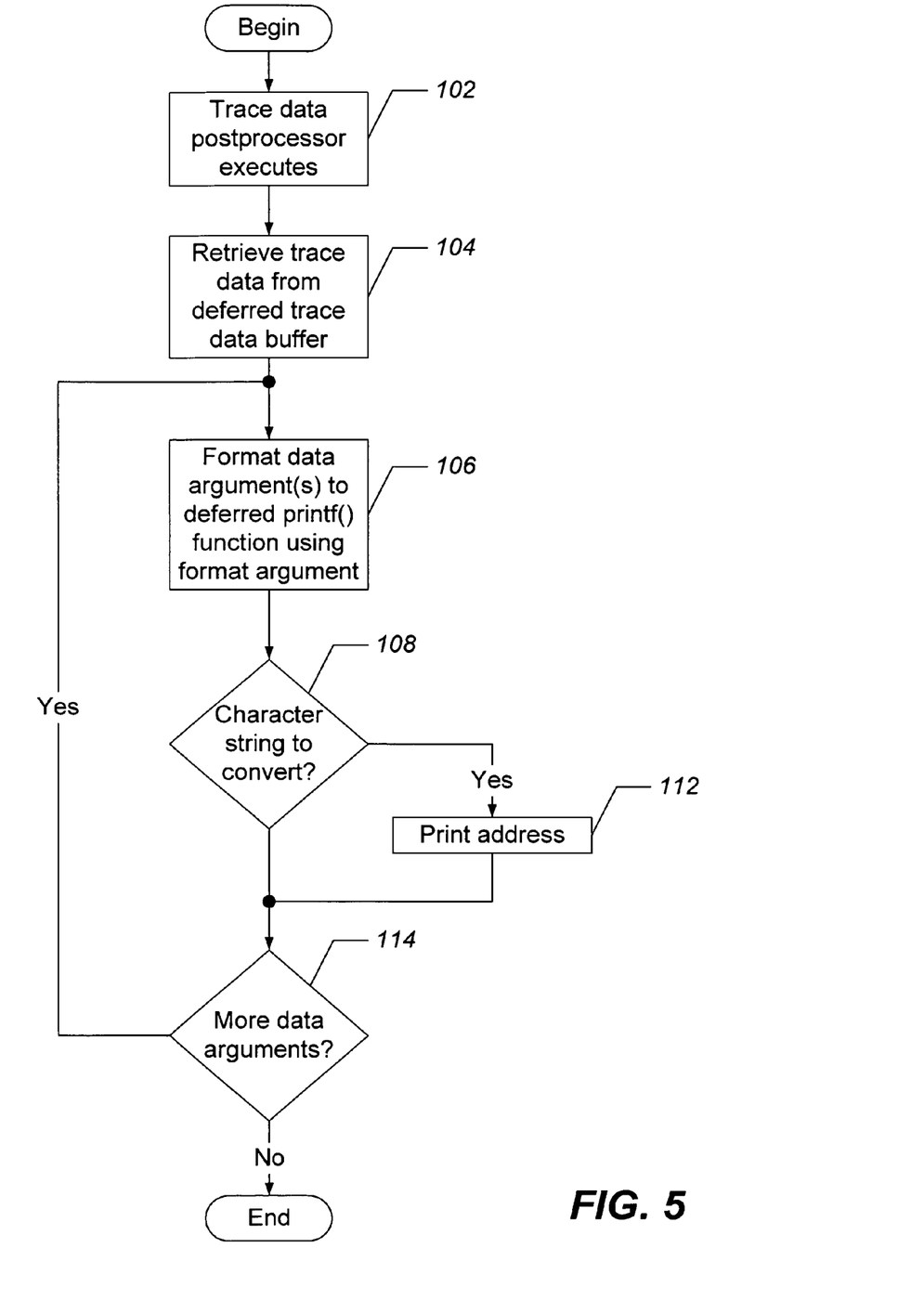
FIG. 5 is a flowchart that illustrates exemplary operations of a trace data postprocessor program in accordance with embodiments of the present invention.

With reference to FIGS. 4 and 5, exemplary operations of methods, systems, and computer program products for deferred computer program tracing, in accordance with embodiments of the present invention, will be described hereafter. Referring now to FIG. 4, operations begin at block 82 where an application program (i.e., any program or executable code, including, for example, the operating system 58, driver programs, utility programs, and traditional application programs) executes on the processor 52. At block 84, a flag may be optionally set to control whether the printf( ) function will operate in a conventional manner or whether the printf( ) function will implement the deferred print capability of the present invention. For example, a software developer may place printf( ) statements in various portions of code to print out data during software testing.

The software developer may then set the deferred printf( ) flag to ensure that calls to the printf( ) function result in a deferred print operation rather than a real-time print operation, which could invalidate the test results or create additional errors if executed in a real-time sensitive portion of code (e.g., in a driver function).

At block 86, an application program function or method calls the deferred printf( ) library function program 68 to perform a print operation. In an exemplary embodiment, the deferred printf( ) library function 38 is implemented by modifying the source code of the conventional printf( ) library function. The general format of a printf( ) call is as follows:

printf(format, arg1, arg2, . . . )

The format argument is an address of a character string that describes how the remaining data arguments (i.e., arg1, arg2, . . . ) are to be displayed. The characters inside the format string that are not preceded by % signs are written, without any conversion, to the standard output. Otherwise, the % sign will be followed by one or more characters that specify the format for displaying the corresponding argument to printf( ). The % sign and the format characters that follow it are often referred to as conversion characters.

As discussed hereinabove, a drawback to the use of the conventional printf( ) library function for performing software program tracing/debugging is the inefficiency in parsing the arguments and formatting the output based on the format argument. Advantageously, in accordance with the present invention, the deferred printf( ) library function program 68 makes a determination at block 88 whether the flag has been set for deferred printing at block 84. If the flag has not been set, then the deferred printf( ) library function program 68 performs a conventional printf( ) print operation at block 92. That is, the arguments to the deferred printf( ) function are parsed, formatted, and printed to the standard output in real-time. Note that by using a flag to control whether a deferred print operation is to be performed allows the deferred printf( ) function 38 to be implemented through a modification to the conventional printf( ) library function. This may allow software developers to use one type of function call to perform a print operation rather than having separate deferred print and conventional print functions, which may result in more complicated code.

Nevertheless, it should be understood that, in accordance with the present invention, the deferred printf( ) library function program 68 may be embodied as a separate routine or program from the conventional printf( ) library function. In this embodiment, a flag for controlling the operations of the conventional printf( ) library function would be unnecessary as control over whether a deferred or real-time print operation is performed would be through selection of either the conventional printf( ) library function or the deferred printf( ) library function program 68 in the application program code.

If the flag has been set for deferred printing as determined at block 88, then, at block 94, the deferred printf( ) library function program 68 may create the deferred trace data buffer 66 in the memory 54. The deferred printf( ) library function program 68 then stores the arguments to the deferred printf( ) function in the deferred trace data buffer 66 in real-time at block 96 without performing any parsing or formatting operations on the arguments and returns to the calling application function or method. The arguments may include a format argument, which is a pointer to a format string, and one or more optional data arguments. The deferred printf( ) library function program 68 may be more efficient than the conventional printf( ) library function program because the argument parsing and formatting operations are postponed to a later time. As a result, an application program may call the deferred printf( ) library function program 68 without adversely affecting the integrity of a test scenario.

The deferred printf( ) library function program 68 may store the format argument as a pointer in the deferred trace data buffer 66 rather than saving the contents of the address space of the application that is referenced by the format argument pointer (i.e., the format data string). As a result, this may allow for reduced memory consumption in the deferred trace data buffer 66. Alternatively, if the format argument pointer will not be valid when the deferred trace data buffer 66 is processed at a later time, then the contents of the memory location in the address space of the application that is referenced by the format argument pointer (i.e., the format data string) may be saved in the deferred trace data buffer 66. In this case, more memory may be consumed in the deferred trace data buffer 66, but the deferred trace data buffer 66 may still be processed even if the application address space is no longer valid or cannot be trusted (e.g., the address space has been overwritten or given up to another application).

Finally, as represented by the connector A, the foregoing operations continue indefinitely for as long as the application program executes on the processor 52. Note that the operation of creating the deferred trace data buffer 66 at block 94 may be performed only if the deferred trace data buffer 66 has not been created previously by a call to the deferred printf( ) library function program 68. If the deferred trace data buffer 66 has already been created, then the deferred printf( ) library function program 68 may obtain a pointer to the deferred trace data buffer 66 in memory at block 94, which may be used to access the deferred trace data buffer 66 at block 96. Note that the trace data buffer 66 may alternatively be created by another program at initialization, for example, thereby obviating the need for the deferred printf( ) library function program 68 to create the deferred trace data buffer 66.

Referring now to FIG. 5, the exemplary operations of the trace data postprocessor program 64 in processing the data stored in the deferred trace data buffer 66 will be described hereafter. The trace data postprocessor program 64 may execute as part of the same execution thread in which the deferred printf( ) library function program 68 executes. Typically, however, the trace data postprocessor program 64 executes as part of a different execution thread from that in which the deferred printf( ) library function program 68 executes. For example, the trace data postprocessor program 64 may be executed as part of a thread that is run periodically or after a test scenario has executed to print out the program trace data that has been collected.

Operations begin at block 102 where the trace data postprocessor program 64 executes on the processor 52. At block 104, the trace data postprocessor program 64 retrieves the trace data (i.e., the arguments from a deferred printf( ) library function program 68 call) from the deferred trace data buffer 66. As discussed hereinabove, these arguments include the format argument and, optionally, one or more data arguments. The trace data postprocessor program 64 may then format and print the arguments to the deferred printf( ) library function program 68 at block 106 using the format argument, which was passed as the first argument. Advantageously, the benefits of a conventional printf( ) function call may be provided. Recall, however, that the format argument is a pointer to a character string. Thus, to format the other data arguments passed to the deferred printf( ) library function program 68 correctly, the character string is preferably stored in static memory or precautions should be taken to ensure that the character string is not moved or overwritten in the memory 54 until after the trace data postprocessor program 64 processes the format argument in the deferred trace data buffer 66. As discussed hereinabove, if the format argument pointer will be invalid at the time the trace data postprocessor program 64 processes the deferred trace data buffer 66, then the format character string itself, rather than the format argument pointer, should be stored in the deferred trace data buffer 66.

At block 108, the trace data postprocessor program 64 checks to determine whether the format argument specifies that one of the other arguments is to be formatted as a character string (i.e., a % s is encountered in the format argument). In this case, the argument to be formatted is a pointer to the character string, which may not be relevant at the time the trace data postprocessor program 64 executes as another process may have acquired the address space in the memory 54 where the character string is stored and may have overwritten the character string data. Therefore, in a preferred embodiment of the present invention, the trace data postprocessor program 64 prints the address where the character string resided when the deferred printf( ) library function program 68 was called at block 112. Finally, as represented by block 114, the trace data postprocessor program 64 continues to process all the arguments stored in the deferred trace data buffer 66 for a particular call to the deferred printf( ) library function program 68 until all the arguments have been processed.

Figure 6:
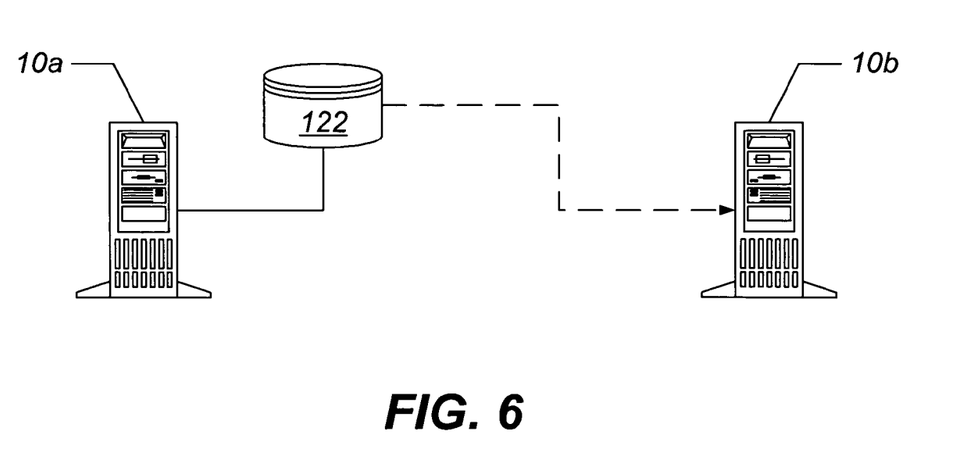
FIG. 6 is a diagram that illustrates exemplary embodiments of the present invention in which the deferred print program and the trace data postprocessor program execute on different data processing systems.

FIG. 6 illustrates alternative embodiments of the present invention in which the deferred printf( ) library function program 68 and the trace data postprocessor program 64 execute on different computing machines. Referring now to FIG. 6, the deferred printf( ) library function program 68 may execute on a first data processing system 10a, which has access to a non-volatile storage medium 122. The operations described hereinabove with respect to FIG. 4 may be performed on the first data processing system 10a. Next, the deferred trace data buffer and the application program address space may be saved in the non-volatile storage medium 122. The contents of the non-volatile storage medium 122 may then be provided to a second data processing system 10b as shown in FIG. 6 where the trace data postprocessor program 64 performs the operations described hereinabove with respect to FIG. 5. Because the application program address space is saved along with the deferred trace data buffer 66 in the non-volatile storage medium 122, the format argument pointer(s) saved in the deferred trace data buffer 66 may still be interpreted. If, however, the format character string itself, rather than the format argument pointer, has been stored in the deferred trace data buffer 66, then the application program address space need not be saved in the non-volatile storage medium.

The flow charts of FIGS. 4 and 5 illustrate the architecture, functionality, and operations of a possible implementation of the trace data postprocessor function 37 and deferred printf( ) library function 38 software. In this regard, each block represents a module, segment, or portion of code, which comprises one or more executable instructions for implementing the specified logical function(s). It should also be noted that in some alternative implementations, the functions noted in the blocks may occur out of the order noted in FIGS. 4 and 5. For example, two blocks shown in succession may in fact be executed substantially concurrently or the blocks may sometimes be executed in the reverse order, depending upon the functionality involved.

From the foregoing it can readily be seen that, in accordance with the present invention, software programs may be debugged using deferred computer program tracing methods, systems, and computer program products. Specifically, a computer program may include calls to a deferred printf( ) library function program that will log its arguments in a buffer in memory for parsing and formatting at a later time. By eliminating the parsing and formatting of the function arguments in real-time, program efficiency may be improved and the likelihood of impacting a software test scenario may be reduced. A trace data postprocessor program may then be used to retrieve the arguments stored in the memory buffer where they are then parsed, formatted, and printed. Advantageously, because the format argument may be saved in the memory buffer as a pointer, memory resources may be conserved while still providing the benefits of a conventional printf( ) function call.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A method of printing data from an application, comprising the steps of:

invoking a print function with a format argument that is a pointer to a memory location in an address space of the application and at least one data argument from the application using a processor;

saving the format argument and the at least one data argument in a deferred trace data buffer;

returning to the application that invoked the print function; then processing the deferred trace data buffer to print the at least one data argument using the processor.

2. A method as recited in claim 1, wherein the step of processing the deferred trace data buffer to print the at least one data argument comprises the steps of:

retrieving the format argument and the at least one data argument from the deferred trace data buffer;

formatting the at least one data argument based on the format argument; and printing the formatted at least one data argument.

3. A method as recited in claim 2, wherein the step of formatting the at least one data argument based on the format argument comprises the steps of:

determining if the format argument specifies a character string conversion; and printing an address of a respective one of the at least one data argument that corresponds to the character string conversion.

4. A method as recited in claim 1, further comprising the step of:

determining if a deferred print flag has been set.

5. A method as recited in claim 4, wherein the step of saving the format argument and the at least one data argument in the deferred trace data buffer comprises the step of:

saving the at least one data argument in the deferred trace data buffer if the deferred print flag has been set; and wherein the step of processing the deferred trace data buffer to print the at least one data argument comprises the step of:

processing the deferred trace data buffer to print the at least one data argument if the deferred print flag has been set.

6. A method as recited in claim 1, wherein the step of saving the format argument and the at least one data argument in the deferred trace data buffer and the step of processing the deferred trace data buffer to print the at least one data argument are performed in different execution threads.

7. A method of printing data from an application, comprising the steps of:
   invoking a print function with a format argument that is a pointer to a memory location in an address space of the application from the application using a processor;
   saving the format argument in a deferred trace data buffer;
   returning to the application that invoked the print function; then
   processing the deferred trace data buffer to print the format argument using the processor.

8. A method as recited in claim 7, wherein the step of saving the format argument in the deferred trace data buffer comprises the step of:
   saving the pointer in the deferred trace data buffer.

9. A method as recited in claim 8, wherein the step of processing the deferred trace data buffer to print the format argument comprises the step of:
   processing the deferred trace data buffer to print a contents of the memory location in the address space of the application that is referenced by the pointer.

10. A method as recited in claim 9, wherein the step of saving the pointer in the deferred trace data buffer and the step of processing the deferred trace data buffer to print the contents of the memory location in the address space of the application that is referenced by the pointer are performed in different execution threads.

11. A method as recited in claim 9, further comprising the step of:
   saving the deferred trace data buffer and a memory contents comprising the address space of the application in a non-volatile storage medium.

12. A method as recited in claim 11, wherein the step of saving the pointer in the deferred trace data buffer is performed on a first computing machine and the step of processing the deferred trace data buffer to print the contents of the memory location in the address space of the application that is referenced by the pointer is performed on a second computing machine, the second computing machine being different from the first computing machine and having access to the deferred trace data buffer and the address space of the application via the non-volatile storage medium.

13. A method as recited in claim 7, wherein the step of saving the format argument in the deferred trace data buffer comprises the step of:
   saving a contents of the memory location in the address space of the application that is referenced by the pointer in the deferred trace data buffer.

14. A method as recited in claim 13, wherein the step of processing the deferred trace data buffer to print the format argument comprises the step of:
   processing the deferred trace data buffer to print the contents of the memory location in the address space of the application that is referenced by the pointer.

15. A method as recited in claim 14, wherein the step of saving the contents of the memory location in the address space that is referenced by the pointer in the deferred trace data buffer and the step of processing the deferred trace data buffer to print the contents of the memory location in the address space of the application that is referenced by the pointer are performed in different execution threads.

16. A system for printing data from an application, comprising:
   means for invoking a print function with a format argument that is a pointer to a memory location in an address space of the application and at least one data argument from the application using a processor;
   means for saving the format argument and the at least one data argument in a deferred trace data buffer;
   means for returning to the application that invoked the print function; and
   means for processing the deferred trace data buffer to print the at least one data argument after returning to the application that invoked the print function using the processor.

17. A system as recited in claim 16, wherein the means for processing the deferred trace data buffer to print the at least one data argument comprises:
   means for retrieving the format argument and the at least one data argument from the deferred trace data buffer;
   means for formatting the at least one data argument based on the format argument; and
   means for printing the formatted at least one data argument.

18. A system as recited in claim 17, wherein the means for formatting the at least one data argument based on the format argument comprises:
   means for determining if the format argument specifies a character string conversion; and
   means for printing an address of a respective one of the at least one data argument that corresponds to the character string conversion.

19. A system as recited in claim 16, further comprising:
   means for determining if a deferred print flag has been set.

20. A system as recited in claim 19, wherein the means for saving the format argument and the at least one data argument in the deferred trace data buffer comprises:
   means for saving the at least one data argument in the deferred trace data buffer if the deferred print flag has been set; and
   wherein the means for processing the deferred trace data buffer to print the at least one data argument comprises:
   means for processing the deferred trace data buffer to print the at least one data argument if the deferred print flag has been set.

21. A system as recited in claim 16, wherein the means for saving the format argument and the at least one data argument in the deferred trace data buffer and the means for processing the deferred trace data buffer to print the at least one data argument execute in different execution threads.

22. A system for printing data from an application, comprising:
   means for invoking a print function with a format argument that is a pointer to a memory location in an address space of the application from the application using a processor;
   means for saving the format argument in a deferred trace data buffer;
   means for returning to the application that invoked the print function; and
   means for processing the deferred trace data buffer to print the format argument after returning to the application that invoked the print function using the processor.

23. A system as recited in claim 22, wherein the means for saving the format argument in the deferred trace data buffer comprises:

means for saving the pointer in the deferred trace data buffer.

24. A system as recited in claim 23, wherein the means for processing the deferred trace data buffer to print the format argument comprises:
   means for processing the deferred trace data buffer to print a contents of the memory location in the address space of the application that is referenced by the pointer.

25. A system as recited in claim 24, wherein the means for saving the pointer in the deferred trace data buffer and the means for processing the deferred trace data buffer to print the contents of the memory location in the address space of the application that is referenced by the pointer execute in different execution threads.

26. A system as recited in claim 24, further comprising:
   means for saving the deferred trace data buffer and a memory contents comprising the address space of the application in a non-volatile storage medium.

27. A system as recited in claim 26, wherein the means for saving the pointer in the deferred trace data buffer executes on a first computing machine and the means for processing the deferred trace data buffer to print the contents of the memory location in the address space of the application that is referenced by the pointer executes on a second computing machine, the second computing machine being different from the first computing machine and having access to the deferred trace data buffer and the address space of the application via the non-volatile storage medium.

28. A system as recited in claim 22, wherein the means for saving the format argument in the deferred trace data buffer comprises:
   means for saving a contents of the memory location in the address space of the application that is referenced by the pointer in the deferred trace data buffer.

29. A system as recited in claim 28, wherein the means for processing the deferred trace data buffer to print the format argument comprises:
   means for processing the deferred trace data buffer to print the contents of the memory location in the address space of the application that is referenced by the pointer.

30. A system as recited in claim 29, wherein the means for saving the contents of the memory location in the address space that is referenced by the pointer in the deferred trace data buffer and the means for processing the deferred trace data buffer to print the contents of the memory location in the address space of the application that is referenced by the pointer execute in different execution threads.

31. A computer program product for printing data from an application, comprising:
   a computer readable storage medium having computer readable program code embodied therein, the computer readable program code comprising:
      computer readable program code for invoking a print function with a format argument that is a pointer to a memory location in an address space of the application and at least one data argument from the application using a processor;
      computer readable program code for saving the format argument and the at least one data argument in a deferred trace data buffer;
      computer readable program code for returning to the application that invoked the print function; and
      computer readable program code for processing the deferred trace data buffer to print the at least one data argument after returning to the application that invoked the print function using the processor.

32. A computer program product as recited in claim 31, wherein the computer readable program code for processing the deferred trace data buffer to print the at least one data argument comprises:
   computer readable program code for retrieving the format argument and the at least one data argument from the deferred trace data buffer;
   computer readable program code for formatting the at least one data argument based on the format argument; and
   computer readable program code for printing the formatted at least one data argument.

33. A computer program product as recited in claim 32, wherein the computer readable program code for formatting the at least one data argument based on the format argument comprises:
   computer readable program code for determining if the format argument specifies a character string conversion; and
   computer readable program code for printing an address of a respective one of the at least one data argument that corresponds to the character string conversion.

34. A computer program product as recited in claim 31, further comprising:
   computer readable program code for determining if a deferred print flag has been set.

35. A computer program product as recited in claim 34, wherein the computer readable program code for saving the format argument and the at least one data argument in the deferred trace data buffer comprises:
   computer readable program code for saving the at least one data argument in the deferred trace data buffer if the deferred print flag has been set; and
wherein the computer readable program code for processing the deferred trace data buffer to print the at least one data argument comprises:
   computer readable program code for processing the deferred trace data buffer to print the at least one data argument if the deferred print flag has been set.

36. A computer program product as recited in claim 31, wherein the computer readable program code for saving the format argument and the at least one data argument in the deferred trace data buffer and the computer readable program code for processing the deferred trace data buffer to print the at least one data argument execute in different execution threads.

37. A computer program product for printing data from an application, comprising:
   a computer readable storage medium having computer readable program code embodied therein, the computer readable program code comprising:
      computer readable program code for invoking a print function with a format argument that is a pointer to a memory location in an address space of the application from the application using a processor;
      computer readable program code for saving the format argument in a deferred trace data buffer;
      computer readable program code for returning to the application that invoked the print function; and
      computer readable program code for processing the deferred trace data buffer to print the format argument after returning to the application that invoked the print function using the processor.

38. A computer program product as recited in claim 37, wherein the computer readable program code for saving the format argument in the deferred trace data buffer comprises:

computer readable program code for saving the pointer in the deferred trace data buffer.

39. A computer program product as recited in claim 38, wherein the computer readable program code for processing the deferred trace data buffer to print the format argument comprises:
   computer readable program code for processing the deferred trace data buffer to print a contents of the memory location in the address space of the application that is referenced by the pointer.

40. A computer program product as recited in claim 39, wherein the computer readable program code for saving the pointer in the deferred trace data buffer and the computer readable program code for processing the deferred trace data buffer to print the contents of the memory location in the address space of the application that is referenced by the pointer execute in different execution threads.

41. A computer program product as recited in claim 39, further comprising:
   computer readable program code for saving the deferred trace data buffer and a memory contents comprising the address space of the application in a non-volatile storage medium.

42. A computer program product as recited in claim 41, wherein the computer readable program code for saving the pointer in the deferred trace data buffer executes on a first computing machine and the computer readable program code for processing the deferred trace data buffer to print the contents of the memory location in the address space of the application that is referenced by the pointer executes on a second computing machine, the second computing machine being different from the first computing machine and having access to the deferred trace data buffer and the address space of the application via the non-volatile storage medium.

43. A computer program product as recited in claim 37, wherein the computer readable program code for saving the format argument in the deferred trace data buffer comprises:
   computer readable program code for saving a contents of the memory location in the address space of the application that is referenced by the pointer in the deferred trace data buffer.

44. A computer program product as recited in claim 43, wherein the computer readable program code for processing the deferred trace data buffer to print the format argument comprises:
   computer readable program code for processing the deferred trace data buffer to print the contents of the memory location in the address space of the application that is referenced by the pointer.

45. A computer program product as recited in claim 44, wherein the computer readable program code for saving the contents of the memory location in the address space that is referenced by the pointer in the deferred trace data buffer and the computer readable program code for processing the deferred trace data buffer to print the contents of the memory location in the address space of the application that is referenced by the pointer execute in different execution threads.

* * * * *